United States Patent [19]

Gerhardt

[11] Patent Number: 4,468,188

[45] Date of Patent: Aug. 28, 1984

[54] BELT-TYPE PARTICLEBOARD PRESS

[75] Inventor: Klaus Gerhardt, Rheurdt, Fed. Rep. of Germany

[73] Assignee: G. Siempelkamp GmbH & Co., Krefeld, Fed. Rep. of Germany

[21] Appl. No.: 411,109

[22] Filed: Aug. 24, 1982

[51] Int. Cl.³ ............................................ A23G 1/20

[52] U.S. Cl. ............................................ 425/371

[58] Field of Search ............................................ 425/371

[56] References Cited

U.S. PATENT DOCUMENTS 4,308,227 12/1981 Ufermann ............................ 264/113

4,315,722 2/1982 Ufermann ............................ 264/113

4,341,135 7/1982 Ufermann ............................ 83/23

*Primary Examiner*—James R. Hall

*Attorney, Agent, or Firm*—Karl F. Ross

[57] ABSTRACT

A central station of a belt-type particleboard press, serving to compact a prepressed mat of wood particles and binder prior to its conversion into particleboard in a final station, comprises a multiplicity of mutually identical frame elements with aligned windows traversed by a pair of platens bracketing upper and lower stretches of two conveyor belts between them, these belt stretches entraining the mat along a horizontal path. The frame elements form supports spaced along the path, each support consisting of one or more such elements and carrying a group of hydraulic rams acting upon the upper platen to place the mat under a pressure which peaks in an upstream zone, decreases in an intermediate zone and levels off in a downstream zone of its path. The supports, whose spacing progressively increases from the upstream end of the path to its downstream end, each consist of a single frame element in the downstream zone and of several frame elements in the intermediate and upstream zones; the plural-element supports have more rams than the single-element supports.

6 Claims, 4 Drawing Figures

BELT-TYPE PARTICLEBOARD PRESS

FIELD OF THE INVENTION

My present invention relates to a belt-type particleboard press. More particularly this invention concerns such a press which continuously presses a mat of particles into a rigid board.

Background of the Invention

Particleboard, which includes chipboard and fiberboard, is made from a mat of wood particles and binder formed in the manner described in commonly owned U.S. Pat. Nos. 4,308,227, 4,315,722 and 4,341,135. The mat formed by such an arrangement is prepressed and thus has modest dimensional stability, but must be pressed again, normally while heating it and under considerable pressure, to produce rigid particleboard.

A continuously operating press of the type referred to includes a preliminary station preparing the wood particles and binder into a mat, a final station finishing and trimming the mat for converting it into a rigid particleboard, and a central or intervening station wherein the prepressed mat is continuously compacted.

A typical press of this character, as described in German laid-open patent application No. 2,224,977, has upper and lower vertically spaced press platens confronting each other and forming a straight horizontal path that can be well over 10 meters long. Respective upper and lower conveyor belts have confronting parallel stretches that are bracketed by the platens and entrain the mat along the path from an upstream end to a downstream end thereof. The platens and the conveyor belts are mounted on a frame structure, with interposition of a set of heavy-duty hydraulic actuators which generate the compacting pressure by acting on one of the platens, normally the upper platen.

In such an arrangement the pressure exerted on the mat reaches a peak in an upstream zone, decreases in an intermediate zone and levels off in a downstream zone of the path. Typically, the hydraulic actuators are evenly distributed between a massive I-beam of the press frame and the upper platen. A controller connected to these actuators pressurizes them to achieve the desired force distribution along the platens. Such arrangements are very expensive and complicated. As a result, they are difficult to operate and repair and are subject to frequent breakdowns.

OBJECTS OF THE INVENTION

It is, therefore, an object of my present invention to provide an improved belt-type particleboard press which overcomes the above-given disadvantages.

A related object is to provide a simple frame structure and actuator arrangement for a press of the above-described general type.

SUMMARY OF THE INVENTION

I realize these objects, according to the instant invention, by providing a belt-type press of the above-described type with a frame structure comprising a multiplicity of substantially identical sheet-steel frame elements disposed in parallel vertical planes perpendicular and to the path of the mat in the intervening station referred to. Certain of these frame elements stand alone to form single-element supports while others are juxtaposed to form plural-element supports. The single-element supports are disposed in the downstream zone while several plural-element supports are disposed in each of the intermediate and upstream zones; the supports are spaced apart by distances increasing progressively from the upstream end of the path to its downstream end. The frame elements have mutually aligned windows traversed by the platens, the confronting belt stretches and the mat, the actuators being disposed in groups in these windows with the number of actuators per support greater near the upstream end than near the downstream end. Advantageously, these actuators comprise hydraulic rams operating under the same pressure by being connected to a common source of pressure fluid.

The system of my instant invention, therefore, uses the distribution of the rams and of the frame elements to establish the desired compacting force and press strength in the various upstream, intermediate and downstream zones of the conveyor path. The individual frame elements ought to be strong enough to be spaced apart by at least 1 meter in the downstream zone. These frame elements can be up to 10 centimeters thick in a very large press, and can be stamped out of a single piece of sheet steel or can be put together by welding from individual pieces.

Eliminating the complex controller of conventional presses greatly simplifies the system. The pressure gradient along the path, established by support and actuator spacing rather than by such a controller, does not vary in operation and can thus be set in the press during its initial assembly. The support and actuator positions can of course be adjusted, but such a procedure is normally not necessary.

If any failure of one of the actuators should occur, the latter can easily be replaced. Ordinary double-thimble hydraulic rams can perform perfectly in a press embodying my invention.

Preferably, the supports in the intermediate zone and at least some of the supports at the upstream end consist each of two frame elements and carry more hydraulic rams than the single-element supports of the downstream zone. The support furthest upstream may have at least three frame elements.

BRIEF DESCRIPTION OF THE DRAWING

The above and other features of my invention will become more readily apparent from the following detailed description given with reference to the accompanying drawing in which.

SPECIFIC DESCRIPTION

Figure 1:
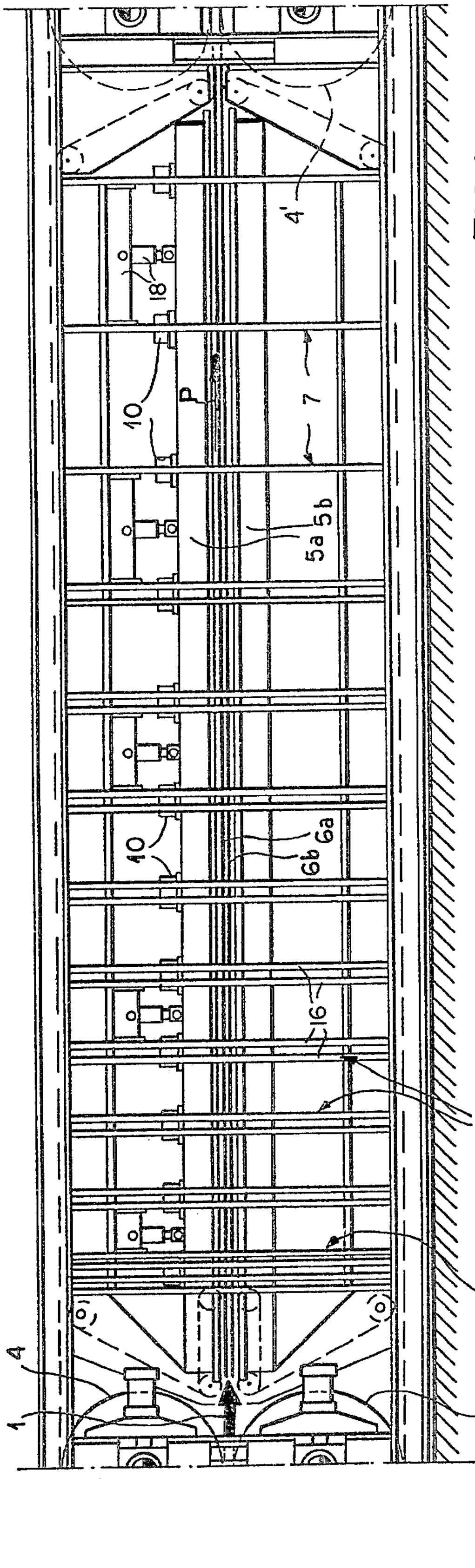
FIG. 1 is a side view of a central station of a press according to this invention.
Figure 4:
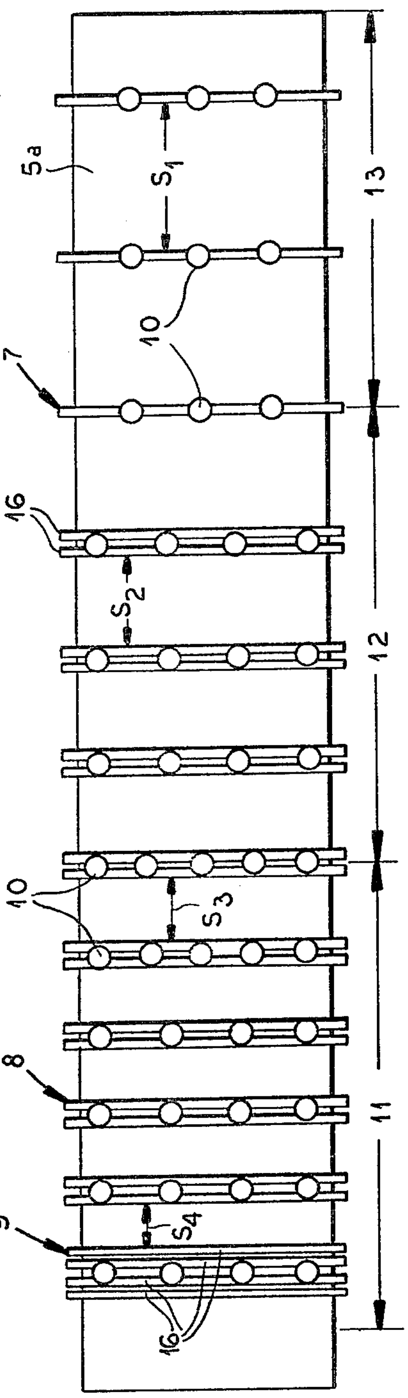
FIG. 4 is a top view of that station.
Figures 2, 3:
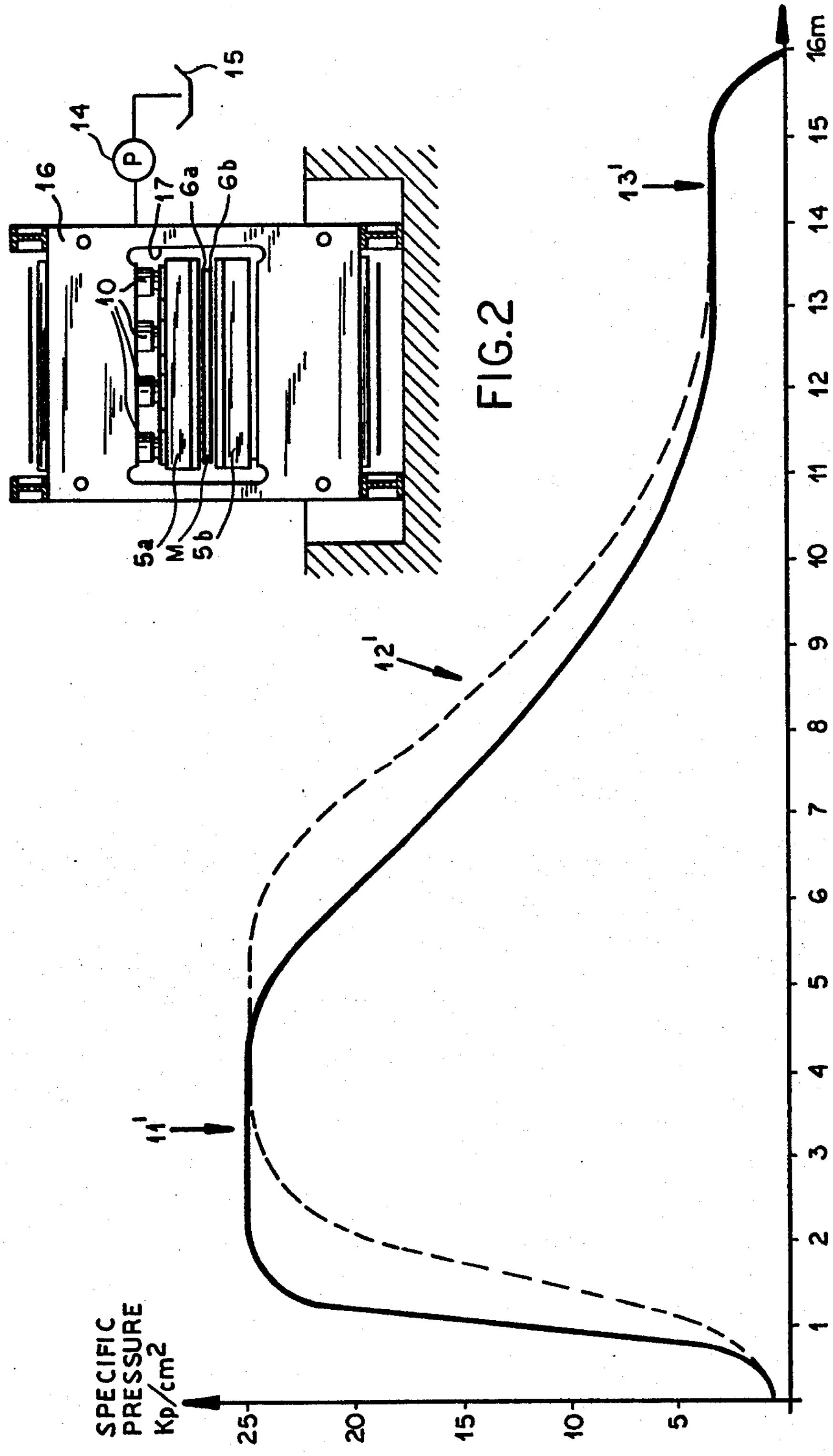
FIG. 2 is a partly schematic end view of the station shown in FIG. 1.
FIG. 3 is a graph showing the pressure gradient in the station of FIGS. 1 and 2.

As seen in FIGS. 1, 2 and 4, a press according to my present invention has a central station which receives a particle mat M (FIG. 2) arriving in a direction 1 from a mat-forming and prepressing preliminary station, represented by rollers 4, of the type described in commonly owned U.S. Pat. Nos. 4,308,227, 4,315,722 and 4,341,135. This central station has upper and lower conveyor belts with confronting stretches 6*a* and 6*b* defining a path P extending horizontally downstream from preliminary station 4 to a final station, represented by rollers 4', in which the mat is converted into particleboard.

The central station shown in the drawing has an upper platen 5*a* and a lower platen 5*b*, both about 16 meters long. A multiplicity of supports 7–9 consist of one or more frame elements 16 with aligned windows 17 traversed by the platens 5*a*, 5*b*, the belt stretches 6*a*, 6*b* and the mat M to be compacted; platen 5*b* rests on the lower window edge while platen 5*a* is under pressure from several hydraulic rams 10 inserted between this platen and the upper window edge. Normally these platens 5*a* and 5*b* are heated, either electrically or by steam, to activate and cure a thermosetting-resin binder admixed with wood particles in the mat being pressed. FIG. 1 further shows mountings 18 by which the upper platen 5*a* is suspended between adjacent supports 7–9.

As seen in FIG. 4, path P is divided into an upstream zone 11, a slightly shorter intermediate zone 12, and a downstream zone 13. The specific pressure exerted upon mat M by the hydraulically loaded upper platen 5*a* in each of these three zones 11, 12 and 13 is illustrated by respective curve portions 11', 12' and 13' of the graph shown in FIG. 3. In the upstream zone 11 the pressure is mainly about 25kp/cm$^2$. In the intermediate zone 12 it drops parabolically to about 5kp/cm$^2$, and in the downstream zone it is mainly about 5kp/cm$^2$.

The supports 7 in the downstream zone 13 are spaced apart by distances $S_1$, greater than 1 meter, and are each formed by only a single frame element 16. Thus the structural strength needed in this zone determines the thickness and strength of these frame elements 16. Three transversely equispaced rams 10 act in each single-element downstream support 7 upon the upper platen 5*a*.

In the intermediate zone 12 the spacing changes to a smaller distance $S_2$, two frame elements 16 constitute each support 8, and four rams 10 are used in each support 8.

In the upstream zone the spacing decreases first to a distance $S_3$ and then to a distance $S_4$; the extreme upstream support 19 consists of four closely juxtaposed frame elements 16 while the other supports in that zone are of the two-element type 8. Four or five rams 10 may be employed, their number being larger in the plural-element supports 8, 9 than in the single-element supports 7. At the junction of the upstream and intermediate zones 11, 12 there is shown a double-element support 8 with five rams 10.

As shown in FIG. 2, a simple pump 14 drawing hydraulic liquid from a reservoir 15 can pressurize all the rams 10 identically and thereby achieve the pressure curve of FIG. 3. The saving in equipment and maintenance costs over prior-art equipment is considerable.

I claim:

1. In a belt-type press for making particleboard, including a preliminary station for prepressing a mass of wood particles and binder into a mat, a final station for converting said mat into a rigid particleboard, and an intervening central station wherein said mat is continuously compacted between confronting stretches of a pair of conveyor belts entraining said mat along a straight horizontal path under pressure from an upper platen and a lower platen bracketing said stretches between them, the pressure exerted by said platens upon said mat reaching a peak in an upstream zone, decreasing in an intermediate zone and leveling off in a downstream zone of said path, said platens being mounted on a frame structure with interposition of a set of actuators for generating said pressure, the improvement wherein said frame structure comprises a multiplicity of substantially identical sheet-steel frame elements disposed in parallel vertical planes perpendicular to said path, some of said frame elements standing alone to form single-element supports, other of said frame elements being juxtaposed to form plural-element supports, said single-element supports being disposed in said downstream zone, several of said plural-element supports being disposed in each of said intermediate and upstream zones, said supports being spaced apart along said path by distances increasing progressively from an upstream end of said path to a downstream end thereof, said frame elements being provided with mutually aligned windows traversed by said platens, said stretches and said mat, said actuators being mounted in groups in said windows, the number of actuators per support being greater near said upstream end than near said downstream end.

2. The press of claim 1 wherein said actuators are inserted in each window between an upper edge thereof and said upper platen.

3. The press of claim 2 wherein said actuators are hydraulic rams connected to a common source of pressure fluid.

4. The press of claim 3 wherein the number of said rams per support is three in said downstream zone and at least four in said intermediate and upstream zones.

5. The press of claim 1 wherein the supports of said intermediate zone and some of the supports of said upstream zone consist of two frame elements each, a support closest to said upstream end consisting of at least three frame elements.

6. The press of claim 1 wherein said path has a length of at least 10 meters, said distances equaling at least 1 meter in said downstream zone.

* * * * *